(12) United States Patent
Sugiyama

(10) Patent No.: US 9,182,872 B2
(45) Date of Patent: Nov. 10, 2015

(54) INDICATOR POSITION DETECTING DEVICE

(71) Applicant: Wacom Co., Ltd., Saitama (JP)

(72) Inventor: Yoshihisa Sugiyama, Saitama (JP)

(73) Assignee: Wacom Co., Ltd., Saitama (JP)

( * ) Notice: Subject to any disclaimer, the term of this patent is extended or adjusted under 35 U.S.C. 154(b) by 140 days.

(21) Appl. No.: 13/931,040

(22) Filed: Jun. 28, 2013

(65) Prior Publication Data

US 2014/0028587 A1 Jan. 30, 2014

(30) Foreign Application Priority Data

Jul. 24, 2012 (JP) ................. 2012-163202

(51) Int. Cl.
*G06F 3/046* (2006.01)
*G06F 3/041* (2006.01)
*G06F 3/0354* (2013.01)

(52) U.S. Cl.
CPC ............ *G06F 3/046* (2013.01); *G06F 3/03545* (2013.01); *G06F 3/041* (2013.01); *G06F 3/0416* (2013.01)

(58) Field of Classification Search
CPC ... G06F 3/0412; G06F 3/0414; G06F 3/0418; G06F 2203/04107; G06F 3/0416; G06F 3/03545; G06F 3/041; G06F 3/046
USPC .......................................... 178/18.01–20.04
See application file for complete search history.

(56) References Cited

U.S. PATENT DOCUMENTS

| | | | | |
|---|---|---|---|---|
| 4,827,086 A * | 5/1989 | Rockwell | ................... | 178/19.01 |
| 4,956,526 A * | 9/1990 | Murakami et al. | ......... | 178/18.08 |
| 5,530,210 A * | 6/1996 | Fukuzaki | ................... | 178/20.01 |
| 5,798,756 A * | 8/1998 | Yoshida et al. | ............... | 345/179 |
| 5,854,881 A * | 12/1998 | Yoshida et al. | ............... | 345/104 |
| 2004/0039545 A1* | 2/2004 | Katsurahira | .................. | 702/150 |
| 2006/0267580 A1 | 11/2006 | Fukushima et al. | | |
| 2006/0267961 A1* | 11/2006 | Onoda | .......................... | 345/173 |
| 2007/0195009 A1* | 8/2007 | Yamamoto et al. | ............ | 345/1.1 |
| 2007/0285389 A1* | 12/2007 | Ito | ................................. | 345/158 |
| 2008/0303774 A1* | 12/2008 | Yoshinaga et al. | .............. | 345/98 |
| 2009/0079671 A1* | 3/2009 | Nishi et al. | ...................... | 345/55 |
| 2012/0162127 A1* | 6/2012 | Onoda | .......................... | 345/174 |

FOREIGN PATENT DOCUMENTS

EP 2372511 A2 10/2011
JP 2002244806 A 8/2002

OTHER PUBLICATIONS

Extended European Search Report dated Nov. 18, 2014, for corresponding EP Application No. 13175007.7, 6 pages.

* cited by examiner

*Primary Examiner* — Lun-Yi Lao
*Assistant Examiner* — Kelly B Hegarty
(74) *Attorney, Agent, or Firm* — Seed IP Law Group PLLC

(57) ABSTRACT

Disclosed herein is an indicator position detecting device that reduces unwanted radiation from a sensor section, while being capable of robustly charging a pen-type position indicator with the sensor section, without requiring reduction in area size of a display region and a detecting region of the sensor section even when the overall device size is reduced. The sensor section has an X-axis direction loop coil group and a Y-axis direction loop coil group disposed in intersecting directions. When a transmission signal is supplied to loop coils of at least one of the X-axis direction loop coil group and the Y-axis direction loop coil group, a control circuit controls a selecting circuit so as not to supply the transmission signal to a determined number of loop coils disposed in at least one peripheral region of the sensor section.

15 Claims, 8 Drawing Sheets

FIG.6

LOOP COIL ALL SCAN OPERATION IN X-AXIS DIRECTION BY INDICATOR POSITION DETECTING DEVICES 200A AND 200B ACCORDING TO FIRST AND SECOND EMBODIMENTS

|   | PHASE | SELECTED COIL | SWITCH FOR RESONANCE | |
|---|---|---|---|---|
| 0 | TRANSMISSION (T) | $21X_2$ ($SX_2$) | $FX_0$, $FX_1$ | ON |
|   | RECEPTION (R) | $21X_0$ ($SX_0$) | 〃 | OFF |
| 1 | TRANSMISSION (T) | $21X_2$ ($SX_2$) | 〃 | ON |
|   | RECEPTION (R) | $21X_1$ ($SX_1$) | 〃 | OFF |
| 2 | TRANSMISSION (T) | $21X_2$ ($SX_2$) | 〃 | OFF |
|   | RECEPTION (R) | $21X_2$ ($SX_2$) | 〃 | OFF |
| 3 | TRANSMISSION (T) | $21X_3$ ($SX_3$) | 〃 | OFF |
|   | RECEPTION (R) | $21X_3$ ($SX_3$) | 〃 | OFF |
|   | ⋮ | ⋮ | ⋮ | |
| n−3 | TRANSMISSION (T) | $21X_{n-3}$ ($SX_{n-3}$) | $FX_{n-1}$, $FX_n$ | OFF |
|   | RECEPTION (R) | $21X_{n-3}$ ($SX_{n-3}$) | 〃 | OFF |
| n−2 | TRANSMISSION (T) | $21X_{n-2}$ ($SX_{n-2}$) | 〃 | OFF |
|   | RECEPTION (R) | $21X_{n-2}$ ($SX_{n-2}$) | 〃 | OFF |
| n−1 | TRANSMISSION (T) | $21X_{n-2}$ ($SX_{n-2}$) | 〃 | ON |
|   | RECEPTION (R) | $21X_{n-1}$ ($SX_{n-1}$) | 〃 | OFF |
| n | TRANSMISSION (T) | $21X_{n-2}$ ($SX_{n-2}$) | 〃 | ON |
|   | RECEPTION (R) | $21X_n$ ($SX_n$) | 〃 | OFF |

FIG. 8

LOOP COIL ALL SCAN OPERATION IN X-AXIS DIRECTION
BY INDICATOR POSITION DETECTING DEVICE 200C
ACCORDING TO THIRD EMBODIMENT

| | PHASE | SELECTED COIL | SWITCH FOR RESONANCE | |
|---|---|---|---|---|
| 0 | TRANSMISSION (T) | $21X_2$  $21X_{n-2}$ | $FX_0 \sim FX_n$ | ON |
| | RECEPTION (R) | $21X_0$ | 〃 | OFF |
| 1 | TRANSMISSION (T) | $21X_2$  $21X_{n-2}$ | 〃 | ON |
| | RECEPTION (R) | $21X_1$ | 〃 | OFF |
| 2 | TRANSMISSION (T) | $21X_2$  $21X_{n-2}$ | 〃 | OFF |
| | RECEPTION (R) | $21X_2$ | 〃 | OFF |
| 3 | TRANSMISSION (T) | $21X_3$ | 〃 | OFF |
| | RECEPTION (R) | $21X_3$ | 〃 | OFF |
| | ⋮ | ⋮ | ⋮ | |
| n−3 | TRANSMISSION (T) | $21X_{n-3}$ | $FX_0 \sim FX_n$ | OFF |
| | RECEPTION (R) | $21X_{n-3}$ | 〃 | OFF |
| n−2 | TRANSMISSION (T) | $21X_{n-2}$  $21X_2$ | 〃 | OFF |
| | RECEPTION (R) | $21X_{n-2}$ | 〃 | OFF |
| n−1 | TRANSMISSION (T) | $21X_{n-2}$  $21X_2$ | 〃 | ON |
| | RECEPTION (R) | $21X_{n-1}$ | 〃 | OFF |
| n | TRANSMISSION (T) | $21X_{n-2}$  $21X_2$ | 〃 | ON |
| | RECEPTION (R) | $21X_n$ | 〃 | OFF |

INDICATOR POSITION DETECTING DEVICE

CROSS-REFERENCE TO RELATED APPLICATION

The present application claims priority under 35 U.S.C. 119(a) to Japanese Patent Application No. 2012-163202, filed Jul. 24, 2012, which is incorporated by reference herein.

BACKGROUND

1. Technical Field

The present invention relates to an indicator position detecting device including an indicated position detecting sensor of an electromagnetic induction system, and particularly to the control of loop coils formed as the indicated position detecting sensor.

2. Description of the Related Art

A position input device of an electromagnetic induction system has recently been used as an input device for a tablet type PC (personal computer) or the like. The position input device includes a position indicator in the shape of a pen (pen type position indicator) and an indicator position detecting device having an input surface on which pointing operation and the inputting of characters, figures, and the like are performed using the pen type position indicator. The pen type position indicator has a resonance circuit including a coil and a capacitor. On the other hand, the indicator position detecting device has an indicated position detecting sensor (position detecting coils), in which an X-axis direction loop coil group formed by disposing a plurality of loop coils in a horizontal direction (X-axis direction) and a Y-axis direction loop coil group formed by disposing a plurality of loop coils in a vertical direction (Y-axis direction) are laminated.

As an example of detecting a position indicated by the pen type position indicator on the indicator position detecting device, one loop coil is selected from the plurality of loop coils forming the indicated position detecting sensor in predetermined order, and a transmission signal is sent out from the selected loop coil to the pen type position indicator. The capacitor of the pen type position indicator is thereby charged. Next, the loop coil used for the transmission is connected to a receiving circuit to receive a signal transmitted from the resonance circuit of the pen type position indicator. Such signal transmission and reception is performed while the loop coils are sequentially selected, whereby the position indicated by the pen type position indicator can be detected on the indicator position detecting device.

The detection of the position indicated by the pen type position indicator on the indicator position detecting device is described in more detail as follows. First, (1) in order to detect where the pen type indicator is on the indicated position detecting sensor, a global scan, which sequentially selects all of the loop coils and detects the position indicated by the pen type position indicator, is performed to identify roughly the indicated position on the indicated position detecting sensor. Next, (2) a sector scan, which selects only a predetermined number of loop coils around the roughly identified position in order and performs signal transmission and reception, is performed to identify the position indicated by the pen type position indicator accurately. Thus, the position indicated by the pen type position indicator on the indicated position detecting sensor can be detected. Incidentally, various inventions have been made for the position input device of the electromagnetic induction system, and Japanese Patent Laid-Open No. 2002-244806, for example, describes details of an example of configuration of the position input device and the like.

Such a position input device of the electromagnetic induction system is not only used as an external input device of a personal computer or the like but also used as an input device of a tablet type PC as described above or an input device of a high-functionality portable telephone terminal referred to as a smart phone. In this case, the position input device of the electromagnetic induction system is disposed so as to be superposed on a display element such as an LCD or the like.

BRIEF SUMMARY

European standards (European Norm) include an R&TTE (Radio equipment and Telecommunications Terminal Equipment) directive, which regulates all wireless devices and the like. This R&TTE directive requires that the position input device of the electromagnetic induction system also reduce unwanted radiation emitted from the indicated position detecting sensor to a predetermined signal level or lower. Accordingly, in a conventional position input device, unwanted radiation is reduced by disposing a magnetic path plate having a larger area than the area of the indicated position detecting sensor in an opposing relationship with the indicated position detecting sensor.

There has recently been a desire to further reduce the product size of the position input device while maintaining the areas of a display region and a position detecting region. In order to satisfy this desire, the area of the magnetic path plate needs to be substantially the same as the area of the indicated position detecting sensor, thus presenting again the problem of how to reduce unwanted radiation as described above. Accordingly, unwanted radiation may be reduced by lowering the signal level of the transmission signal supplied to each loop coil forming the indicated position detecting sensor, or shortening the time during which the transmission signal is supplied. However, when the signal level of the transmission signal supplied to the loop coils is lowered or the supply time is shortened, sufficient power cannot be supplied to the pen type position indicator, and therefore sensitivity or accuracy of indicated position detection is decreased.

In view of the above, according to an aspect of the present invention, an indicator position detecting device is provided that solves the problem of unwanted radiation while ensuring the charging of a pen type position indicator, without reducing the area of a display region or a position detecting region even when the product is miniaturized.

Means for Solving the Problems

In order to solve the above problems, according to an embodiment of the present invention, there is provided an indicator position detecting device including: a sensor substrate that detects a position indicated by an indicator, the sensor substrate having a plurality of first loop coils disposed in a first direction and a plurality of second loop coils disposed in a second direction intersecting the first direction; a transmission signal generating circuit that generates a transmission signal to be supplied to at least one loop coil of the first loop coils and the second loop coils to perform electromagnetic coupling with the indicator; a received signal processing circuit that receives a signal induced in at least one loop coil of the first loop coils and the second loop coils by electromagnetic coupling with the indicator, and that detects the position indicated by the indicator; a loop coil selecting circuit that selectively supplies the transmission signal generated by the transmission signal generating circuit to at least one loop coil of the first loop coils and the second loop coils; a control circuit that controls loop coil selection by the loop coil selecting circuit; and a magnetic path plate that forms a magnetic path for a magnetic flux generated by the transmission signal supplied to at least one loop coil of the first loop coils and the second loop coils, the magnetic path plate being disposed so as to be superposed on the sensor substrate; wherein when the transmission signal is supplied to loop coil(s) disposed in at least one direction among the first loop coils disposed in the first direction and the second loop coils disposed in the second direction, the control circuit controls the loop coil selecting circuit so as not to supply the transmission signal to a determined number of loop coils that are disposed in the at least one direction and that are in at least one peripheral region of the sensor substrate.

The indicator position detecting device according to the embodiment of the present invention includes the sensor substrate, the transmission signal generating circuit, the received signal processing circuit, the loop coil selecting circuit, and the control circuit that controls the loop coil selecting circuit. The plurality of first loop coils and the plurality of second loop coils are disposed in the intersecting directions on the sensor substrate having substantially the same area as the area of the magnetic path plate. When the transmission signal is supplied to at least one loop coil disposed in at least one direction out of the first loop coils and the second loop coils, the control circuit controls the loop coil selecting circuit so as not to supply the transmission signal to a determined number of loop coils that are disposed in the at least one direction and that are in at least one peripheral region of the sensor substrate.

Thereby, the transmission signal is not supplied to the determined number of loop coils disposed in the at least one direction and in the at least one peripheral region of the sensor substrate, while the magnetic path plate forms an excellent magnetic path for the magnetic fluxes generated by the other loop coils supplied with the transmission signal. Thus unwanted radiation can be reduced.

Effect of the Invention

According to the present invention, an indicator position detecting device is provided that solves the problem of unwanted radiation while ensuring the charging of a pen type position indicator without reducing the area of a display region or a position detecting region even when the product is miniaturized.

BRIEF DESCRIPTION OF THE DRAWINGS

FIG. 6 is a diagram of assistance in explaining a process of selecting loop coils in the indicator position detecting device according to the first or second embodiment of the present invention;

FIG. 8 is a diagram of assistance in explaining a process of selecting loop coils in the indicator position detecting device according to the third embodiment of the present invention.

DETAILED DESCRIPTION

Preferred embodiments of an indicator position detecting device according to the present invention will hereinafter be described with reference to the drawings.

Figure 1:
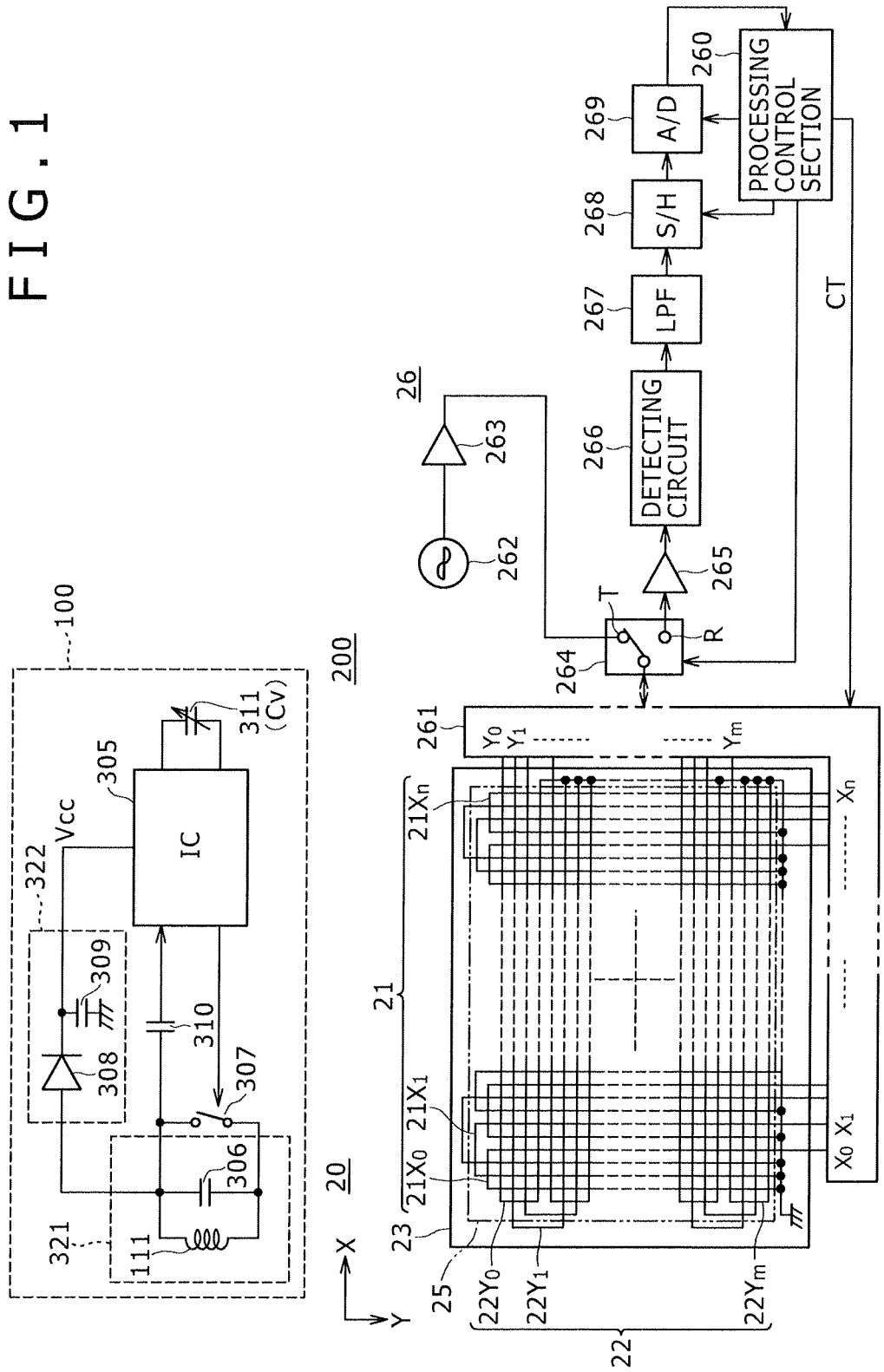
FIG. 1 is a diagram of assistance in explaining an example of configuration of a position input device according to an embodiment of the present invention.

Description of Position (Coordinate) Input Device of Electromagnetic Induction System Description will first be made of a general configuration of a position (coordinate) input device of an electromagnetic induction system (which device will hereinafter be described simply as a position input device) including an indicator position detecting device according to the present invention. FIG. 1 is a diagram of assistance in explaining an example of configuration of the position input device of the electromagnetic induction system according to this embodiment. As shown in FIG. 1, the position input device according to the present embodiment includes a pen type position indicator 100 and an indicator position detecting device 200.

Example of Configuration of Pen Type Position Indicator 100

A circuit configuration of the pen type position indicator 100 is shown enclosed by a dotted line in FIG. 1. Specifically, a coil 111 as an inductance element and a capacitor 306 form a resonance circuit 321. A switch 307 is connected in parallel with the resonance circuit 321. The switch 307 is formed so as to be subjected to on-off control by an IC 305. Incidentally, the coil 111 is wound around a rod-shaped member formed of a magnetic material such as ferrite, for example.

The resonance circuit 321 formed by the coil 111 and the capacitor 306 receives an electromagnetic induction signal sent out from the indicator position detecting device 200. The received electromagnetic induction signal is rectified by a rectifier circuit (power supply circuit) 322 including a diode 308 and a capacitor 309, whereby power Vcc to be supplied to the IC 305 is generated. The IC 305 is connected to the resonance circuit 321 via a capacitor 310. The IC 305 controls the operation of the resonance circuit 321 on the basis of a signal supplied to the IC 305 via the capacitor 310.

The IC 305 is connected with a variable capacitance capacitor 311 for sensing pressure, so that the IC 305 can detect a change in capacitance Cv corresponding to pen pressure. That is, the IC 305 detects the pen pressure applied to the pen tip of the pen type position indicator 100 from the value of the capacitance Cv. The IC 305 then converts the detected pen pressure into an eight-bit digital signal. The digital signal is used for on-off control of the switch 307 by the IC 305, and is thereby detected by the indicator position detecting device 200.

Example of Configuration of Indicator Position Detecting Device 200

On the other hand, in a sensor section 20 of the indicator position detecting device 200, as shown in FIG. 1, an X-axis direction loop coil group 21 and a Y-axis direction loop coil group 22 are respectively disposed on the top surface and the undersurface of a sensor substrate 23. Incidentally, in the embodiments to be described in the following, as shown in FIG. 1, the horizontal direction of the sensor substrate 23 is set as an X-axis direction, and the vertical direction of the sensor substrate 23 is set as a Y-axis direction.

As shown in FIG. 1, the X-axis direction loop coil group 21 includes n (n is an integer of two or more) rectangular loop coils $21X_0$ to $21X_n$ arranged in the X-axis direction. The Y-axis direction loop coil group 22 includes m (m is an integer of two or more) rectangular loop coils $22Y_0$ to $22Y_m$ arranged in the Y-axis direction. The loop parts of the X-axis direction loop coil group 21 and the loop parts of the Y-axis direction loop coil group 22 in the sensor section 20 form a position detecting area 25.

The sensor section 20 is connected to a position detecting circuit 26 via a connector section not shown in the figures. The position detecting circuit 26 includes a selecting circuit 261, an oscillator 262, a current driver 263, a transmission and reception switching circuit 264, a receiving amplifier 265, a detecting circuit 266, a low-pass filter 267, a sample and hold circuit 268, an ND (Analog to Digital) converter circuit 269, and a processing control section 260. The X-axis direction loop coil group 21 and the Y-axis direction loop coil group 22 are connected to the selecting circuit 261. The selecting circuit 261 sequentially selects one loop coil of the two loop coil groups 21 and 22 according to a control signal CT from the processing control section 260.

The oscillator 262 generates an alternating-current signal of a frequency f0. This alternating-current signal is supplied to the current driver 263 to be converted into a current, and the current is then sent out to the transmission and reception switching circuit 264. Incidentally, the oscillator 262 and the current driver 263 form a transmission signal generating circuit. In addition, the processing control section 260 processes a signal output from the ND converter circuit 269, and thereby determines whether the pen type position indicator 100 is detected by the sensor section 20, that is, whether the pen type position indicator 100 is in a use state or a non-use state.

When the pen type position indicator 100 is recognized to be in a non-use state, the gain of the current driver 263 is set low, whereby a low voltage mode is set in which mode a low voltage transmission signal is generated. When the pen type position indicator 100 is recognized to be in a use state, the gain of the current driver 263 is set high, whereby a high voltage mode is set in which mode a high voltage transmission signal is generated.

The transmission and reception switching circuit 264 selects a connection destination (a transmitting side terminal T or a receiving side terminal R) to which the loop coil selected by the selecting circuit 261 is connected, in each predetermined time under control of the processing control section 260. The transmitting side terminal T is connected with the current driver 263, and the receiving side terminal R is connected with the receiving amplifier 265.

Therefore, at a time of transmission, the alternating-current signal from the current driver 263 is supplied to the loop coil selected by the selecting circuit 261 via the transmitting side terminal T of the transmission and reception switching circuit 264. At a time of reception, an electromagnetic induction signal generated in the loop coil selected by the selecting circuit 261 is supplied to the receiving amplifier 265 via the selecting circuit 261 and the receiving side terminal R of the transmission and reception switching circuit 264, amplified by the receiving amplifier 265, and then sent out to the detecting circuit 266.

The signal detected by the detecting circuit 266 is supplied to the ND converter circuit 269 via the low-pass filter 267 and the sample and hold circuit 268. The A/D converter circuit 269 converts the analog signal into a digital signal, and supplies the digital signal to the processing control section 260. The processing control section 260 performs control for position detection. Specifically, the processing control section 260 controls the selection of a loop coil by the selecting circuit 261, signal switching by the transmission and reception switching circuit 264, the timing of the sample and hold circuit 268, and the like. Incidentally, the receiving amplifier 265, the detecting circuit 266, the low-pass filter 267, the sample and hold circuit 268, and the A/D converter circuit 269 form a received signal processing circuit.

The processing control section 260 forms a control circuit. The processing control section 260 controls operation so as to send out an electromagnetic induction signal from a selected loop coil of the X-axis direction loop coil group 21 or the Y-axis direction loop coil group 22, by switching the transmission and reception switching circuit 264 so as to be connected to the transmitting side terminal T and controlling the selecting circuit 261. As described above, the resonance circuit 321 of the pen type position indicator 100 receives the electromagnetic induction signal sent out from the selected loop coil, and the rectifier circuit 322 generates power $V_{CC}$ to be supplied to the IC 305.

Next, the processing control section 260 switches the transmission and reception switching circuit 264 so as to be connected to the receiving side terminal R. Then, each loop coil of the X-axis direction loop coil group 21 and the Y-axis direction loop coil group 22 receives an electromagnetic induction signal transmitted from the pen type position indicator 100. The processing control section 260 calculates a position indicated by the pen type position indicator 100 as respective coordinate values in the X-axis direction and the Y-axis direction in the position detecting area 25 of the sensor section 20 on the basis of the level of the voltage value of induced voltage generated in each loop coil. The processing control section 260 then supplies the information of the calculated coordinate values to an external personal computer, for example.

In addition, the processing control section 260 can also detect pen pressure information converted into an eight-bit digital signal, for example, by performing control for detecting the on-and-off state of the signal supplied from the pen type position indicator 100 in addition to performing control for detecting the position indicated by the pen type position indicator 100.

General Configuration of Device which is Provided with Display Function and which Includes Indicator Position Detecting Device 200

Figure 2:
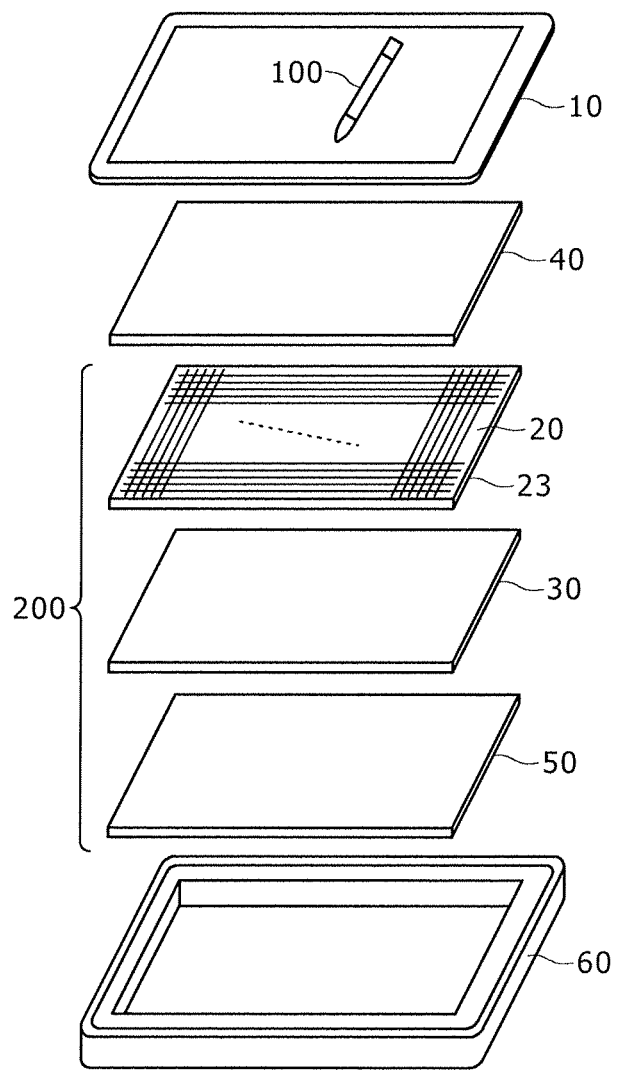
FIG. 2 is an exploded perspective view of assistance in explaining a general configuration of a device, which is provided with a display function and which includes an indicator position detecting device according to the embodiment of the present invention.

FIG. 2 is an exploded perspective view of assistance in explaining a general configuration of a device provided with a display function, which device is configured using the indicator position detecting device 200 according to the present embodiment. As shown in FIG. 2, a protective plate (not shown) such as glass or the like is disposed in one surface (top surface) of a bezel 10, and operation by the pen type position indicator 100 is performed on the protective plate. An LCD 40 as a display device is disposed on the side of another surface (undersurface) of the bezel 10. The sensor section 20 and a motherboard 50 opposed to each other with a magnetic path plate 30 interposed between the sensor section 20 and the motherboard 50 form the indicator position detecting device 200 on the lower side of the LCD 40, that is, on the side of a surface of the LCD 40 opposite from a display surface of the LCD 40. The indicator position detecting device 200 is disposed so as to be opposed to the bezel 10 with the LCD 40 interposed between the indicator position detecting device 200 and the bezel 10. The LCD 40, the sensor section 20, the magnetic path plate 30, and the motherboard 50 are housed in a casing 60, and the bezel 10 is disposed so as to seal the casing 60, whereby the device provided with a display function is formed. Incidentally, the motherboard 50 is provided with various circuits including a communicating circuit, a control circuit for the LCD 40, and the like as well as the position detecting circuit 26 of the indicator position detecting device 200 as shown in FIG. 1.

The magnetic path plate 30 forms a magnetic path for an electromagnetic induction signal (alternating-current magnetic field) generated by each loop coil of the loop coil groups 21 and 22 provided on the sensor section 20. This prevents the divergence of a magnetic flux generated by each loop coil, thereby improving sensitivity of detection of the position indicated by the pen type position indicator 100. In a similar manner, the magnetic path plate 30 functions to prevent the radiation of the electromagnetic induction signal to the outside of the indicator position detecting device 200.

Therefore, the magnetic path plate 30 functions effectively when the magnetic path plate 30 has a predetermined area equal to or more than that of the sensor section 20, more specifically a region formed by the loop coils.

Figure 3A:
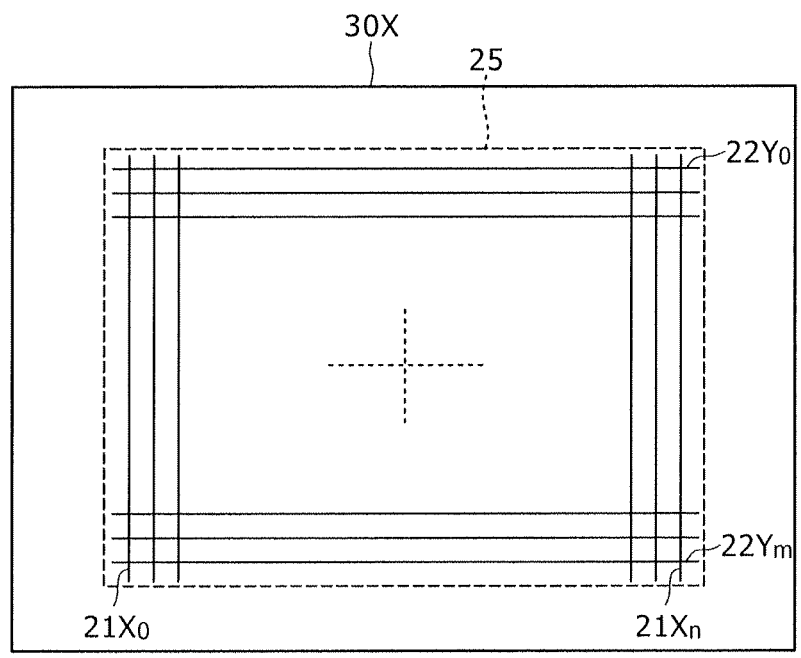
FIGS. 3A and 3B are diagrams of assistance in explaining the sizes of a magnetic path plate and a position detecting area.
Figure 3B:
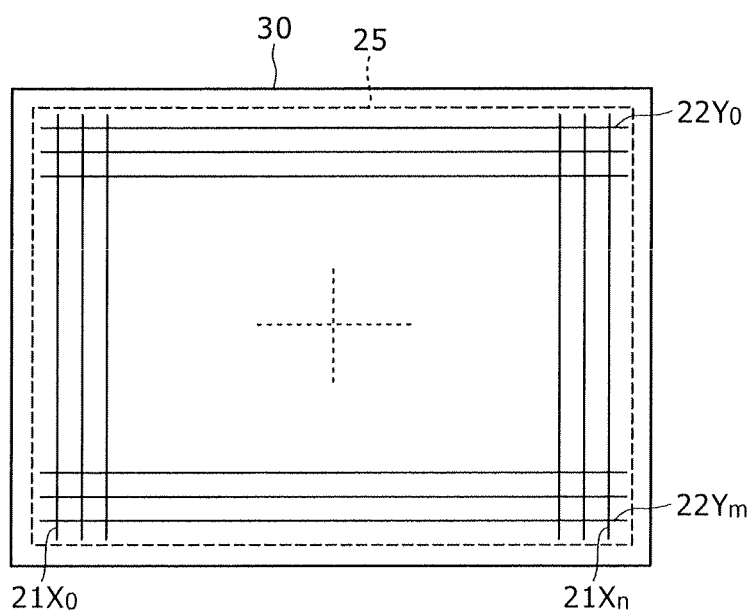

FIGS. 3A and 3B are diagrams of assistance in explaining the size of the position detecting area 25 formed by the loop coils of the X-axis direction loop coil group 21 and the loop coils of the Y-axis direction loop coil group 22 and the sizes of a conventional magnetic path plate 30X and the magnetic path plate 30 according to the embodiment of the present invention. In order for the magnetic path plate 30 to function effectively, as indicated by the conventional magnetic path plate 30X in FIG. 3A, the size of the magnetic path plate 30X needs to be sufficiently larger than the size of the position detecting area 25 formed by the loop coils of the X-axis direction loop coil group 21 and the loop coils of the Y-axis direction loop coil group 22. It is known that unwanted radiation is reduced when the magnetic path plate 30X has a larger region than the region of the position detecting area 25 of the sensor section 20, as shown in FIG. 3A.

However, as shown in FIG. 3B, the device provided with a display function according to the embodiment of the present invention is miniaturized without the position detecting area 25 of the sensor section 20 being reduced in size. Therefore, the area of a region other than the position detecting area 25 in the sensor substrate 23, that is, a peripheral region of the sensor substrate 23 is reduced. The magnetic path plate 30 used in the device provided with a display function according to the embodiment of the present invention thus has a slightly larger area than the position detecting area 25 of the sensor section 20, as shown in FIG. 3B. Incidentally, the magnetic path plate 30 according to the embodiment of the present invention has substantially the same area as the sensor substrate 23, and is housed in the casing 60 in a state of being disposed so as to be superposed on the sensor substrate 23.

Therefore, with decrease in difference between the area of the position detecting area 25 and the area of the magnetic path plate 30, it becomes difficult for the magnetic path plate 30 to reduce unwanted radiation caused by electromagnetic induction signals sent out from a predetermined number of loop coils of the X-axis direction loop coil group 21 that are disposed in one peripheral (end) region or both peripheral (end) regions of the sensor substrate 23 along the X-axis direction or a predetermined number of loop coils of the Y-axis direction loop coil group 22 that are disposed in one peripheral region or both peripheral regions of the sensor substrate 23 along the Y-axis direction.

A user can view information displayed on the LCD 40 from the side of the bezel (front panel) 10 of the device provided with a display function, on which side operation is performed by the pen type position indicator 100, through the protective plate (not shown) such as glass, for example. The protective plate is fitted in the bezel and has transparency. The sensor section 20 disposed under the LCD 40 can receive various instruction inputs from the pen type position indicator 100.

Incidentally, though not shown in FIG. 2, the LCD 40 and the sensor section 20 are each connected to a corresponding circuit section on the motherboard 50. In addition, the device provided with a display function as shown in FIG. 2 is realized as a tablet type terminal or a high-functionality portable telephone terminal referred to as a smart phone, for example.

Description of First to Third Embodiments of Indicator Position Detecting Device 200

First to third embodiments of the indicator position detecting device 200 according to the present invention will be described in the following. The general configuration shown in FIG. 1 can be applied to each of indicator position detecting devices 200A, 200B, and 200C according to the first to third embodiments to be described in the following, and the indicator position detecting devices 200A, 200B, and 200C are each used in, for example, a device provided with a display function as shown in FIG. 2. Therefore, in the indicator position detecting devices 200A, 200B, and 200C according to the first to third embodiments to be described in the following, parts formed in a similar manner to those of the indicator position detecting device 200 described with reference to FIG. 1 and FIG. 2 are identified by the same reference symbols, and detailed description of the parts will be omitted.

However, the first to third embodiments to be described in the following each have a different configuration in the peripheral circuit of the sensor section 20 and the selecting circuit 261 and also have a different configuration for loop coil selection control by the processing control section 260. In the following, the first to third embodiments will be described in detail.

First Embodiment

Figure 4:
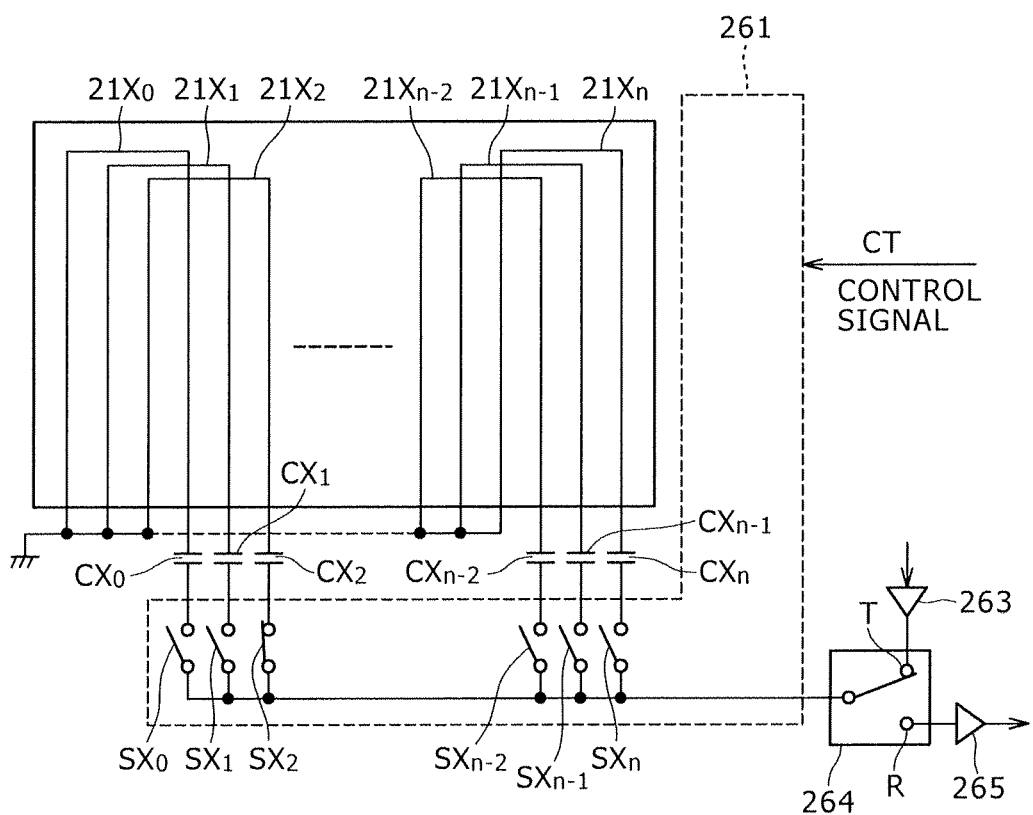
FIG. 4 is a diagram of assistance in explaining an indicator position detecting device according to a first embodiment of the present invention.

FIG. 4 is a diagram of assistance in explaining a configuration of principal parts of the indicator position detecting device 200A according to the first embodiment of the present invention. FIG. 4 shows a part including a sensor section 20A and a selecting circuit 261 within the indicator position detecting device 200A. The sensor section 20A is a part corresponding to the sensor section 20 of the indicator position detecting device 200 shown in FIG. 1.

In addition, FIG. 4 shows only a transmission and reception switching circuit 264, a current driver 263, and a receiving amplifier 265 forming a position detecting circuit 26 in order to show relation to the selecting circuit 261. In addition, FIG. 4 shows three loop coil parts each located in both peripheral regions in the X-axis direction in an X-axis direction loop coil group 21 forming the sensor section 20A, and does not show the other loop coils in the X-axis direction nor a Y-axis direction loop coil group 22, in order to simplify description.

As shown in FIG. 4, the selecting circuit 261 has switches $SX_0$, $SX_1$, $SX_2$, ..., $SX_{n-2}$, $SX_{n-1}$, and $SX_n$ so as to correspond to loop coils $21X_0$, $21X_1$, $21X_2$, ..., $21X_{n-2}$, $21X_{n-1}$, and $21X_n$ in the X-axis direction. The switches $SX_0$, $SX_1$, $SX_2$, ..., $SX_{n-2}$, $SX_{n-1}$, and $SX_n$ have one terminal thereof connected to the corresponding loop coils $21X_0$, $21X_1$, $21X_2$, ..., $21X_{n-2}$, $21X_{n-1}$, and $21X_n$, respectively, and have another terminal connected to the transmission and reception switching circuit 264. In addition, capacitors $CX_0$ to $CX_n$ are disposed between the loop coils $21X_0$ to $21X_n$ in the X-axis direction and the switches $SX_0$ to $SX_n$, respectively.

Incidentally, though not shown, the selecting circuit 261 also has switches for loop coils forming the Y-axis direction loop coil group 22 as in the case of the loop coils in the X-axis direction. In addition, capacitors are respectively disposed between the loop coils in the Y-axis direction and the switches corresponding to the loop coils in the Y-axis direction as in the case of the loop coils in the X-axis direction.

Thus, the selecting circuit 261 has the switches $SX_0$, $SX_1$, $SX_2$, ..., $SX_{n-2}$, $SX_{n-1}$, and $SX_n$ provided so as to correspond to the plurality of loop coils, respectively, arranged in the X-axis direction. Each of the plurality of switches $SX_0$, $SX_1$, $SX_2$, ..., $SX_{n-2}$, $SX_{n-1}$, and $SX_n$ forming the selecting circuit 261 is switched by a control signal CT from the processing control section 260 of the position detecting circuit 26.

Similarly, the selecting circuit 261 also has switches corresponding to the plurality of loop coils, respectively, arranged in the Y-axis direction, and each of the switches is switched by the control signal CT from the processing control section 260 of the position detecting circuit 26. Incidentally, control of the plurality of loop coils arranged in the Y-axis direction is performed in a similar manner to control of the plurality of loop coils arranged in the X-axis direction. Thus, the following description will be made of the control of the plurality of loop coils arranged in the X-axis direction, and description of the control of the plurality of loop coils arranged in the Y-axis direction will be omitted.

As described with reference to FIGS. 3A and 3B, unwanted radiation of the sensor section 20A depends on arrangement relation between the position detecting area 25, which is defined mainly by the loop coils arranged in the peripheral regions in the X-axis direction/Y-axis direction of the sensor section 20A, and the magnetic path plate 30. The unwanted radiation is known to occur in large amounts when a transmission signal is sent out from a predetermined number of loop coils located in the peripheral regions of the position detecting area 25 of the sensor section 20A to the pen type position indicator 100. Accordingly, the indicator position detecting device 200A according to the first embodiment suppresses the occurrence of the unwanted radiation by not transmitting the transmission signal to the predetermined number of loop coils located in the peripheral regions of the position detecting area 25 at a time of a global scan in which each loop coil is selected and the position of the pen type position indicator 100 is roughly detected, for example.

In the first embodiment, specifically, the processing control section 260 performs switching control so as not to use the two loop coils $21X_0$ and $21X_1$ located in the left peripheral region in the X-axis direction and the two loop coils $21X_n$ and $21X_{n-1}$ located in the right peripheral region in the X-axis direction in FIG. 4 for sending out the transmission signal. However, the processing control section 260 performs switching control so that the loop coils $21X_0$, $21X_1$, $21X_{n-1}$, and $21X_n$ can be used as usual for receiving a signal from the pen type position indicator 100.

The processing control section 260 performs switching control so as to send out the transmission signal from the loop coil $21X_2$ adjacent to the loop coil $21X_1$ in timing in which the transmission signal would normally be sent out from each of the two loop coils $21X_0$ and $21X_1$ located in the left peripheral region in the X-axis direction. Similarly, the processing control section 260 performs switching control so as to sent out the transmission signal from the loop coil $21X_{n-2}$ adjacent to the loop coil $21X_{n-1}$ in timing in which the transmission signal would normally be sent out from each of the two loop coils $21X_{n-1}$ and $21X_n$ located in the right peripheral region in the X-axis direction.

Thereby, even when the area of the magnetic path plate 30 is made smaller than conventional, and is substantially the same area as the size of the sensor substrate 23, for example, because the loop coils located in both peripheral regions in the X-axis direction of the sensor section 20A are not used, excellent magnetic paths are formed between the loop coils that are disposed in the peripheral regions and driven and the magnetic path plate 30. Therefore the unwanted radiation can be reduced greatly. As shown in FIG. 4, the switches $SX_o$ and $SX_1$ corresponding to the loop coils $21X_0$ and $21X_1$ are turned off in the normal timing of transmission of the transmission signal.

In actuality, however, there is an output impedance (off resistance) of a few MΩ (megohms) to a few tens of MΩ when the switches are off. Alternatively, switches having a desired off resistance are intentionally arranged. Thereby, the output impedance (R) of the switch $SX_0$, the loop coil $21X_0$ (L), and the capacitor $CX_0$ (C) form an RLC resonance circuit. The output impedance (R) of the switch $SX_1$, the loop coil $21X_1$ (L), and the capacitor $CX_1$ (C) similarly form an RLC resonance circuit.

When the transmission signal is sent out from the loop coil $21X_2$, the transmission signal is induced also in the loop coils $21X_0$ and $21X_1$ by tuned resonance, and the transmission signal at such a level as not to constitute unwanted radiation is sent out also from the loop coils $21X_0$ and $21X_1$. Thus, the resonance circuit formed by the switch $SX_0$, the loop coil $21X_0$, and the capacitor $CX_0$ and the resonance circuit formed by the switch $SX_1$, the loop coil $21X_1$, and the capacitor $CX_1$ are configured so as to produce tuned resonance tuned to the transmission signal sent out from the loop coil $21X_2$.

However, the transmission signal used at the time of the global scan is usually a burst wave whose transmission time is 42 μsec (microseconds), so that the transmission signal may not be expected to be induced sufficiently by tuned resonance. Accordingly, when the transmission signal is supplied to the loop coil $21X_2$, the time of supply of the transmission signal is lengthened through control of the processing control section 260 to raise the transmission level of the transmission signal from the loop coils $21X_0$ and $21X_1$, which transmission signal is induced by the tuned resonance of the loop coils $21X_0$ and $21X_1$, in such a range as not to cause unwanted radiation.

Incidentally, it suffices to determine a degree to which the time of supply of the transmission signal to the loop coil $21X_2$ is lengthened according to the power supply voltage generated in the pen type position indicator 100 and a frame rate at the time of the global scan for the device provided with a display function in which device the magnetic path plate 30 is disposed. The above description has been made by taking as an example a case where consideration is given to the loop coils $21X_0$, $21X_1$, and $21X_2$ on the side of the left peripheral region in the X-axis direction. However, a similar description applies to a case where consideration is given to the loop coils $21X_{n-2}$, $21X_{n-1}$, and $21X_n$ on the side of the right peripheral region in the X-axis direction.

Incidentally, FIG. 4 shows a case in which a global scan is performed in a direction from the left end side to the right end side in the X-axis direction, the switch $SX_2$ is in an on state, and the other switches are in an off state.

Second Embodiment

Figure 5:
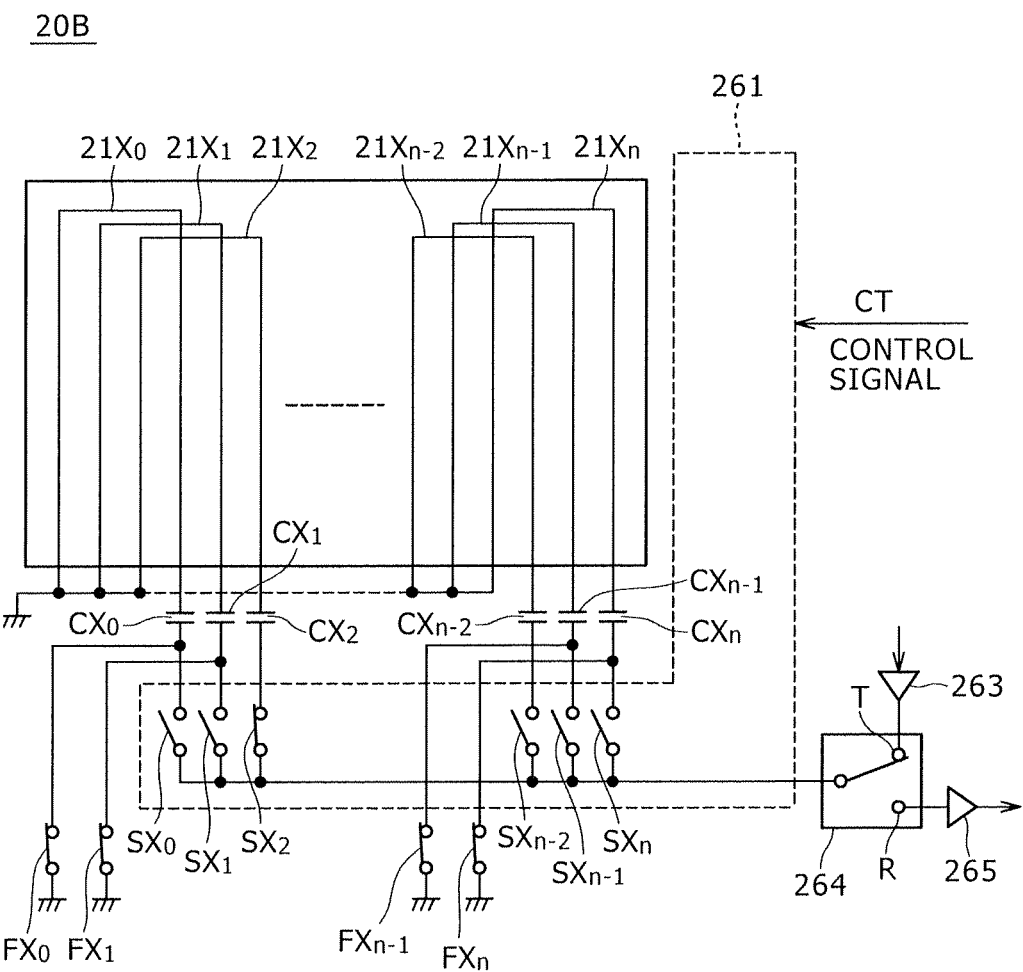
FIG. 5 is a diagram of assistance in explaining an indicator position detecting device according to a second embodiment of the present invention.

FIG. 5 is a diagram of assistance in explaining a configuration of principal parts of the indicator position detecting device 200B according to the second embodiment of the present invention. As in the first embodiment described with reference to FIG. 4, FIG. 5 shows a part including a sensor section 20B and a selecting circuit 261 within the indicator position detecting device 200B. The sensor section 20B is a part corresponding to the sensor section 20 of the indicator position detecting device 200 shown in FIG. 1. As in the first embodiment described with reference to FIG. 4, parts of an X-axis direction loop coil group 21 on both end sides of the X-axis direction loop coil group 21 are shown, and a Y-axis direction loop coil group 22 is not shown.

As is shown by comparison of FIG. 5 with FIG. 4, the indicator position detecting device 200B according to the second embodiment shown in FIG. 5 is provided with switches $FX_0$, $FX_1$, $FX_{n-1}$, and $FX_n$ formed by an FET (Field Effect Transistor), for example. Except for this, the indicator position detecting device 200B according to the second embodiment is configured in a similar manner to the indicator position detecting device 200A according to the first embodiment shown in FIG. 4.

As shown in FIG. 5, the switches $FX_0$, $FX_1$, $FX_{n-1}$, and $FX_n$ are provided respectively for loop coils $21X_0$, $21X_1$, $21X_{n-1}$, and $21X_n$ located in peripheral regions in the X-axis direction, so that the loop coils $21X_0$, $21X_1$, $21X_{n-1}$, and $21X_n$ are connected to or disconnected from a ground by switching control of a processing control section 260.

Also in the indicator position detecting device 200B according to the second embodiment, the loop coils $21X_0$, $21X_1$, $21X_{n-1}$, and $21X_n$ located in the peripheral regions in the X-axis direction are not used for sending out a transmission signal. In timing in which the transmission signal would normally be sent out from the loop coils $21X_0$, $21X_1$, $21X_{n-1}$, and $21X_n$ located in the peripheral regions in the X-axis direction, the transmission signal is sent out from respective adjacent loop coils $21X_2$ and $21X_{n-2}$. Switches $SX_0$, $SX_1$, $SX_2$, . . . , $SX_{n-2}$, $SX_{n-1}$, and $SX_n$ forming the selecting circuit 261 are thus controlled by the processing control section 260 as in the case of the indicator position detecting device 200A according to the first embodiment shown in FIG. 4.

In the indicator position detecting device 200B according to the second embodiment, the switches $FX_0$, $FX_1$, $FX_{n-1}$, and $FX_n$ are each turned on simultaneously in timing in which the transmission signal would normally be supplied to the loop coils $21X_0$, $21X_1$, $21X_{n-1}$, and $21X_n$. In other words, the switches $FX_0$, $FX_1$, $FX_{n-1}$, and $FX_n$ are each turned on simultaneously in timing in which the transmission signal is supplied to the loop coils $21X_2$ and $21X_{n-2}$ adjacent to the loop coils ($21X_0$, $21X_1$, $21X_{n-1}$, and $21X_n$) to which the transmission signal is not supplied. The loop coils $21X_0$, $21X_1$, $21X_{n-1}$, and $21X_n$ are thereby connected to the ground in timing in which the transmission signal is supplied to the loop coils $21X_2$ and $21X_{n-2}$.

When the switch $FX_0$ is turned on, an RLC resonance circuit is formed by an output impedance (R) when the switch $FX_0$ is on, the loop coil $21X_0$ (L), and a capacitor $CX_0$ (C), and a Q (Quality factor) value is increased. Similarly, when the switch $FX_1$ is turned on, an RLC resonance circuit is formed by an output impedance (R) when the switch $FX_1$ is on, the loop coil $21X_1$ (L), and a capacitor $CX_1$ (C), and a Q-value is increased.

That is, in the case of the RLC resonance circuits including the loop coil $21X_0$ and the loop coil $21X_1$, respectively, as shown in FIG. 4, tuned resonance is produced with the off resistances of the switches $SX_0$ and $SX_1$, so that a high Q-value cannot be expected to be obtained. However, as shown in FIG. 5, the switches $FX_0$ and $FX_1$ for connecting the respective loop coils $21X_0$ and $21X_1$ connected to the switches $SX_0$ and $SX_1$ to the ground are provided, and the switches $FX_0$ and $FX_1$ having a low on resistance are turned on in timing in which the transmission signal is supplied to the loop coil $21X_2$. Thereby, the RLC resonance circuits including the loop coil $21X_0$ and the loop coil $21X_1$, respectively, can be driven with a low resistance. Thus, tuned resonance can be produced efficiently with the high Q-value for a frequency being used.

Incidentally, the Q-value indicates the sharpness of a peak of resonance in the resonance circuit. In the RLC resonance circuit, the smaller the value of the series resistance (R), the larger the Q-value, which means that tuned resonance can be produced efficiently between the resonance circuits. Thus, the transmission signal supplied to the loop coils $21X_2$ and $21X_{n-2}$ effects tuned resonance of the resonance circuits including the loop coils $21X_0$, $21X_1$, $21X_{n-1}$, and $21X_n$ and increased in the Q-value, so that the transmission signal having a predetermined signal level can be sent out also from the loop coils $21X_0$, $21X_1$, $21X_{n-1}$, and $21X_n$.

It is therefore possible to sent out the transmission signal having a predetermined signal level also from the loop coils $21X_0$, $21X_1$, $21X_{n-1}$, and $21X_n$ to which the transmission signal is not supplied. The pen type position indicator 100 is thereby supplied with power properly even in the peripheral regions in the X-axis direction. In this case, the transmission signal is not supplied to the loop coils $21X_0$, $21X_1$, $21X_{n-1}$, and $21X_n$. Consequently, the magnetic path plate 30 is in a state of extending out with respect to the loop coils $21X_2$ and $21X_{n-2}$ driven as loop coils for sending out the transmission signal. This means that the magnetic path plate 30 having a greater distance between ends thereof than a distance between the loop coil $21X_2$ and the loop coil $21X_{n-2}$ driven as loop coils for sending out the transmission signal is disposed, and the magnetic path plate 30 functions effectively against unwanted radiation. The same is true for the Y-axis direction loop coil group. When the Y-axis direction loop coil group is used for sending out the transmission signal, the magnetic path plate 30 is in a state of extending out with respect to the loop coils $22Y_2$ and $22Y_{n-2}$. This means that the magnetic path plate 30 having a greater distance between ends thereof than a distance between the loop coil $22Y_2$ and the loop coil $22Y_{n-2}$ driven as loop coils for sending out the transmission signal is disposed, and the magnetic path plate 30 functions effectively against unwanted radiation.

Incidentally, when the switches $FX_0$, $FX_1$, $FX_{n-1}$, and $FX_n$ remain turned on, the Q-values are kept high, and phase variations are increased, which may cause jitter and a coordinate shift. Accordingly, when the loop coils $21X_0$, $21X_1$, $21X_{n-1}$, and $21X_n$ are used as receiving conductors for receiving a signal from the pen type position indicator 100, the switches $FX_0$, $FX_1$, $FX_{n-1}$, and $FX_n$ are switched off by the processing control section 260.

All Scan Operation in X-Direction in First and Second Embodiments

FIG. 6 is a diagram of assistance in explaining all scan operation performed on the X-axis direction loop coil group 21 of the indicator position detecting device 200A or 200B according to the first or second embodiment described with reference to FIG. 4 or FIG. 5. In FIG. 6, a column of phases indicates whether a loop coil selected in the selecting circuit 261 is used for sending out a transmission signal or used for receiving a signal from the pen type position indicator 100. Specifically, a transmission phase (T) is a state in which the transmission and reception switching circuit 264 is switched to the transmitting side terminal T, and a reception phase (R) is a state in which the transmission and reception switching circuit 264 is switched to the receiving side terminal R.

A column of selected coils indicates a coil selected in the selecting circuit 261 as a transmitting coil for sending out the transmission signal or as a receiving coil for receiving the signal from the pen type position indicator 100. A column of switches for resonance indicates the on/off state of the switches $FX_0$, $FX_1$, $FX_{n-1}$, and $FX_n$ provided for the loop coils $21X_0$, $21X_1$, $21X_{n-1}$, and $21X_n$ not used as transmitting coils. Incidentally, the indicator position detecting device 200A according to the first embodiment does not have the switches $FX_0$, $FX_1$, $FX_{n-1}$, and $FX_n$, and thus the item is referred to only in the case of the second embodiment.

Description in the following will be made of operation when a global scan is performed from the left end side to the right end side in the X-axis direction in the sensor section 20A or 20B shown in FIG. 4 or FIG. 5. The transmission and reception switching circuit 264 of the position detecting circuit 26 is switched so as to select the transmitting side terminal T and the receiving side terminal R in order by switching control of the processing control section 260. Thereby, as shown on the left end side of FIG. 6, the indicator position detecting device 200A or 200B is sequentially switched to the transmission phase and the reception phase.

In the case of the indicator position detecting device 200A or 200B according to the first or second embodiment shown in FIG. 4 or FIG. 5, the loop coils $21X_0$, $21X_1$, $21X_{n-1}$, and $21X_n$ in both peripheral regions in the X-axis direction are not used as transmitting coils. Therefore, as shown in FIG. 6, in a zeroth and a first transmission phase in which the loop coil $21X_0$ and the loop coil $21X_1$ should normally be selected as a transmitting coil, the loop coil $21X_2$ adjacent to these loop coils is selected as a transmitting coil. That is, in the zeroth and first transmission phases, as shown in FIG. 4 and FIG. 5, the switches $SX_0$ and $SX_R$ are set in an off state, and the switch $SX_2$ is set in an on state.

Thereafter, from a second transmission phase to an (n-2)th transmission phase, the loop coils from the loop coil $21X_2$ to the loop coil $21X_{n-2}$ are selected as a transmitting coil in order. Then, in an (n-1)th and an nth transmission phase in which the loop coil $21X_{n-1}$ and the loop coil $21X_n$ should normally be selected as a transmitting coil, the loop coil $21X_{n-2}$ adjacent to these loop coils is selected as a transmitting coil. That is, in the (n-1)th and nth transmission phases, as shown in FIG. 4 and FIG. 5, the switches $SX_{n-1}$ and $SX_n$ are set in an off state, and the switch $SX_{n-2}$ is set in an on state.

Thereby, the loop coils $21X_0$, $21X_1$, $21X_{n-1}$, and $21X_n$ in both peripheral regions in the X-axis direction are not supplied with the transmission signal. Thus, in the transmission phases for sending out the transmission signal, the magnetic path plate has a size such that end parts of the magnetic path plate respectively extend out further outward than the loop coils $21X_2$ and $21X_{n-2}$ disposed in both peripheral regions in the X-axis direction, and exerts a function as a magnetic path plate, so that unwanted radiation can be reduced greatly. When the transmission signal is supplied to the loop coils $21X_2$ and $21X_{n-2}$, the transmission signal is sent out also from the adjacent loop coils $21X_0$, $21X_1$, $21X_{n-1}$, and $21X_n$ due to tuned resonance. Therefore, power can be supplied to the pen type position indicator 100 also through these loop coils $21X_0$, $21X_1$, $21X_{n-1}$, and $21X_n$ to such a degree as not to cause unwanted radiation. However, the transmission signal is not supplied to a desired number of loop coils disposed in each peripheral region of the sensor section 20A or 20B, or the loop coils $21X_0$, $21X_1$, $21X_{n-1}$, and $21X_n$ in the present example. Thus, the magnetic path plate 30 having a large size is disposed for the loop coils located at extreme ends of the sensor section 20A or 20B, which loop coils are driven to send out the transmission signal. Therefore unwanted radiation can be reduced effectively by the magnetic path plate 30.

Incidentally, in the reception phases, the loop coils $21X_0$ to $21X_n$ are selected in order as in a conventional manner, and therefore a position indicated by the pen type position indicator 100 is detected as in a conventional manner. In the case of the indicator position detecting device 200B according to the second embodiment, when the transmission signal is supplied to the loop coil $21X_2$ or $21X_{n-2}$, the switches $FX_0$ and $FX_1$ or the switches $FX_{n-1}$ and $FX_n$ are turned on, as indicated in the column of the switches for resonance in FIG. 6. In this case, the Q-values of the resonance circuits including the loop coils $21X_0$, $21X_1$, $21X_{n-1}$, and $21X_n$ are increased by tuned resonance. Thus, the transmission signal supplied to the loop coils $21X_2$ and $21X_{n-2}$ can be induced in the resonance circuits including the loop coils $21X_0$, $21X_1$, $21X_{n-1}$, and $21X_n$ more efficiently, and the transmission signal can be sent out efficiently with the signal level thereof within such a range as not to cause unwanted radiation.

Third Embodiment

Figure 7:
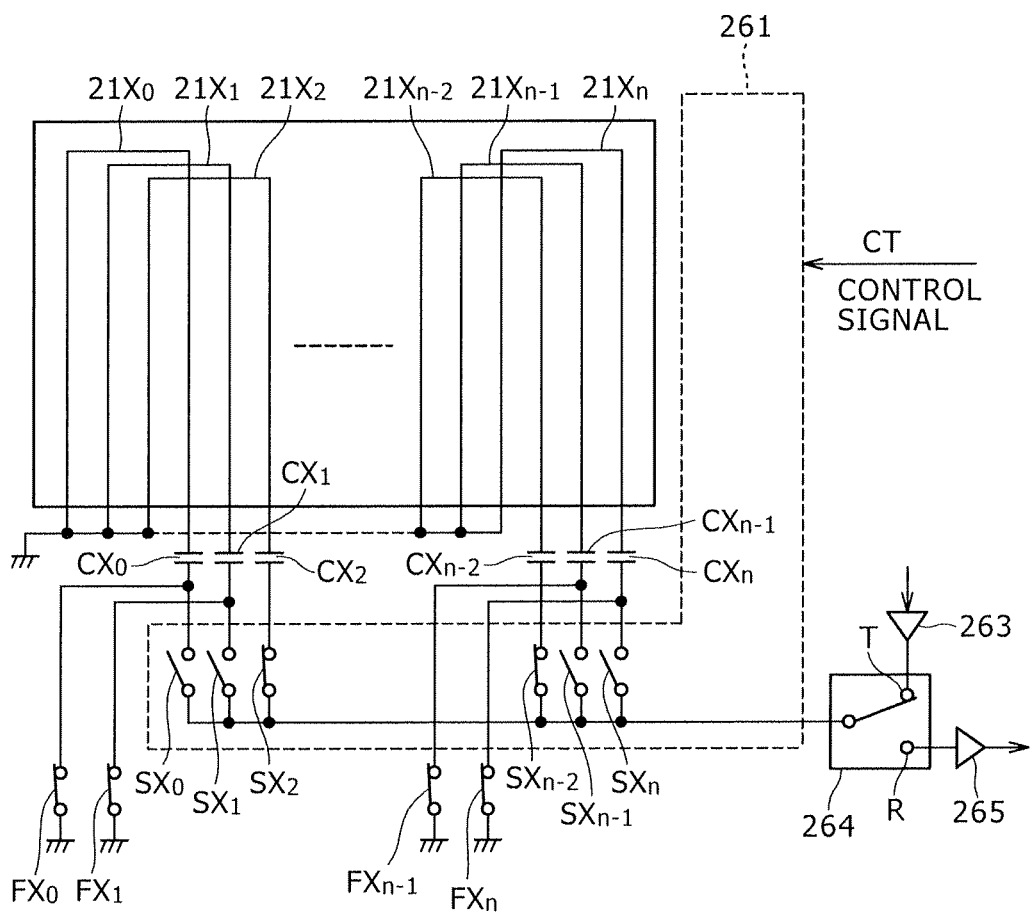
FIG. 7 is a diagram of assistance in explaining an indicator position detecting device according to a third embodiment of the present invention.

FIG. 7 is a diagram of assistance in explaining a configuration of principal parts of the indicator position detecting device 200C according to the third embodiment of the present invention. As in the first embodiment described with reference to FIG. 4, FIG. 7 shows a part including a sensor section 20C and a selecting circuit 261 within the indicator position detecting device 200C. The sensor section 20C is a part corresponding to the sensor section 20 of the indicator position detecting device 200 shown in FIG. 1. As in the first embodiment described with reference to FIG. 4, parts of an X-axis direction loop coil group 21 on both end sides of the X-axis direction loop coil group 21 are shown, and a Y-axis direction loop coil group 22 is not shown.

As is shown by comparison of FIG. 7 with FIG. 5, the indicator position detecting device 200C according to the present third embodiment has a similar configuration to that of the indicator position detecting device 200B according to the second embodiment. However, switching control of each switch forming the selecting circuit 261 in the indicator position detecting device 200C according to the present third embodiment is different from that of the indicator position detecting device 200B according to the foregoing second embodiment. Specifically, as shown in FIG. 7, when a transmission signal is supplied to the loop coil $21X_2$, the transmission signal is also supplied to the loop coil $21X_{n-2}$ simultaneously. Conversely, when the transmission signal is supplied to the loop coil $21X_{n-2}$, the transmission signal is also supplied to the loop coil $21X_2$ simultaneously.

In addition, when the transmission signal is supplied to the loop coils $21X_2$ and $21X_{n-2}$, the transmission time of the transmission signal is lengthened so as to correspond to the times that the transmission signal should normally be supplied to each of the loop coils $21X_0$, $21X_1$, $21X_{n-1}$, and $21X_n$, as in the foregoing first and second embodiments. Thereby, at a time of a global scan, the time during which the transmission signal is supplied to the loop coils $21X_2$ and $21X_{n-2}$ is lengthened, and a pen type position indicator 100 can secure power supply voltage for driving an IC 305 favorably even when one or a plurality of loop coils disposed in each of both peripheral regions in the X-axis direction are not used for sending out the transmission signal.

All Scan Operation in X-Direction in Third Embodiment

FIG. 8 is a diagram of assistance in explaining all scan operation performed on the X-axis direction loop coil group 21 of the indicator position detecting device 200C according to the third embodiment described with reference to FIG. 7. In FIG. 8, respective columns of phases, selected coils, and switches for resonance have similar meanings to those of FIG. 6 described above. Also in the present third embodiment, description will be made of operation when a global scan is performed from the left end side to the right end side in the X-axis direction in the sensor section 20C shown in FIG. 7.

Also in the case of the indicator position detecting device 200C according to the present third embodiment, the transmission and reception switching circuit 264 of a position detecting circuit 26 is switched so as to select a transmitting side terminal T and a receiving side terminal R in order by switching control of a processing control section 260. Thereby, as shown on the left end side of FIG. 8, the indicator position detecting device 200C is sequentially switched to a transmission phase and a reception phase.

In the case of the indicator position detecting device 200C according to the third embodiment shown in FIG. 7, the loop coils $21X_0$, $21X_1$, $21X_{n-1}$, and $21X_n$ in both peripheral regions in the X-axis direction are not used as loop coils for sending out the transmission signal. Therefore, as shown in FIG. 8, in a zeroth and a first transmission phase in which the loop coil $21X_0$ and the loop coil $21X_1$ should normally be a loop coil for sending out the transmission signal, the adjacent loop coil $21X_2$ and the loop coil $21X_{n-2}$ located on an opposite side in the sensor section 20C are loop coils for sending out the transmission signal. Also in a second transmission phase, in addition to the loop coil $21X_2$ that should normally be a loop coil for sending out the transmission signal, the loop coil $21X_{n-2}$ located on the opposite side in the sensor section 20C is also a transmitting coil. That is, in the zeroth, first, and second transmission phases, the switches $SX_0$ and $SX_1$ are set in an off state, and the switches $SX_2$ and $SX_{n-2}$ are set in an on state.

Thereafter, from a third transmission phase to an (n-3)th transmission phase, the loop coils from the loop coil $21X_3$ to the loop coil $21X_{n-3}$ are selected as a loop coil for sending out the transmission signal in order. Then, in an (n-2)th transmission phase, the loop coil $21X_{n-2}$ and the loop coil $21X_2$ located on the opposite side in the sensor section 20C are selected as loop coils for sending out the transmission signal. Similarly, also in an (n-1)th and an nth transmission phase in which the loop coil $21X_{n-1}$ and the loop coil $21X_n$ should normally be a loop coil for sending out the transmission signal, the loop coil $21X_{n-2}$ adjacent to these loop coils and the loop coil $21X_2$ located on the opposite side in the sensor section 20C are selected as transmitting coils. That is, in the (n-2)th, (n-1)th, and nth transmission phases, the switches $SX_{n-1}$ and $SX_n$ are set in an off state, and the switches $SX_{n-2}$ and $SX_2$ are set in an on state.

Thereby, the loop coils $21X_0$, $21X_1$, $21X_{n-1}$, and $21X_n$ located respectively in both peripheral regions in the X-axis direction are not supplied with the transmission signal. Thus, unwanted radiation caused by the transmission signal supplied to the loop coils $21X_0$, $21X_1$, $21X_{n-1}$, and $21X_n$ located in both peripheral regions in the X-axis direction can be reduced greatly. When the transmission signal is supplied to the loop coils $21X_2$ and $21X_{n-2}$, the transmission signal is also induced in the adjacent loop coils $21X_0$, $21X_1$, $21X_{n-1}$, and $21X_n$ due to tuned resonance, and the transmission signal is sent out. Thereby, power can be supplied to the pen type position indicator 100 also through these loop coils $21X_0$, $21X_1$, $21X_{n-1}$, and $21X_n$ at a desired transmission signal level. In addition, because the transmission signal is not supplied to the loop coils $21X_0$, $21X_1$, $21X_{n-1}$, and $21X_n$, the transmission signal can be sent out efficiently at such a signal level as not to cause unwanted radiation.

Incidentally, in the reception phases, the loop coils $21X_0$ to $21X_n$ are selected in order as in a conventional manner, and therefore a position indicated by the pen type position indicator 100 is detected as in a conventional manner. In the case of the indicator position detecting device 200C according to the third embodiment, when the transmission signal is supplied to each of the loop coils $21X_2$ and $21X_{n-2}$, the switches $FX_0$, $FX_1$, $FX_{n-1}$, and $FX_n$ are turned on simultaneously, as indicated in the column of the switches for resonance in FIG. 8. In this case, the Q-values of the resonance circuits including the loop coils $21X_0$, $21X_1$, $21X_{n-1}$, and $21X_n$ are increased by tuned resonance. Thus, the transmission signal supplied to the loop coils $21X_2$ and $21X_{n-2}$ can be induced in the resonance circuits including the loop coils $21X_0$, $21X_1$, $21X_{n-1}$, and $21X_n$ more efficiently, and the transmission signal can be sent out efficiently as a transmission signal having a desired signal level within such a range as not to cause unwanted radiation.

Effects of Embodiments

An indicator position detecting device that solves the problem of unwanted radiation caused by the electromagnetic induction system while excellently maintaining electromagnetic coupling relation to a position indicator can be realized without the area of a position detecting region being reduced even when the product is miniaturized. That is, when loop coils are driven to transmit an electromagnetic induction signal to the position indicator, unwanted radiation can be reduced by not supplying the transmission signal to a determined number of loop coils disposed in a peripheral region of the sensor section 20. In addition, the electromagnetic coupling relation to the position indicator in the peripheral region can be maintained excellently by lengthening the transmission time of the signal transmitted from a loop coil adjacent to the determined number of loop coils disposed in the peripheral region of the sensor section 20. Further, the transmission signal at a predetermined signal level is also sent out from the determined number of loop coils disposed in the peripheral region of the sensor section 20, which loop coils are controlled not to be supplied with the transmission signal, by making the determined number of loop coils produce tuned resonance with the adjacent loop coil. It is thereby possible to secure excellent electromagnetic coupling relation to the position indicator while dealing with unwanted radiation.

Modifications

It is to be noted that while the foregoing embodiments have been described by taking as an example a case where a scan for locating a position indicated by the position indicator is performed on the loop coils forming the X-axis direction loop coil group 21, the present invention is not limited to this. A scan for locating a position indicated by the position indicator can also be performed on the loop coils forming the Y-axis direction loop coil group 22 in place of the loop coils forming the X-axis direction loop coil group 21.

In addition, a scan for locating a position indicated by the position indicator can also be performed while selecting the loop coils forming the X-axis direction loop coil group 21 and the loop coils forming the Y-axis direction loop coil group 22 as appropriate. In addition, while description has been made of loop coils disposed in the X-axis direction as loop coils from which the transmission signal is not sent out, it is needless to say that loop coils disposed in the Y-axis direction can also be loop coils from which the transmission signal is not sent out.

Further, while description has been made of a case where the same loop coils are selectively used for signal transmission and signal reception, it is obvious that the present invention is also applicable to a case where a loop coil group disposed in a first direction (for example the X-axis direction) is used for signal transmission, and a loop coil group disposed in a second direction (for example the Y-axis direction) different from the first direction is used for signal reception.

In addition, the number of loop coils subjected to transmission signal sending-out control, which loop coils are disposed in one peripheral region or both peripheral regions of the sensor section 20, depends on positional relation between the determined number of loop coils disposed in the peripheral region or the peripheral regions of the sensor section 20 and the magnetic path plate disposed so as to be superposed on the sensor section, that is, relation between the area occupied by the loop coil group and the area of the magnetic path plate. In addition, while description has been made of one or a plurality of loop coils from an extreme end of the sensor section 20 as an object of transmission signal sending-out control, it is not necessarily required that consecutive loop coils be set as the object. It suffices to perform the transmission signal sending-out control on a determined number of loop coils disposed in a peripheral region of the sensor section 20 so as to reduce unwanted radiation with relation to the performance of the magnetic path plate.

What is claimed is:

1. An indicator position detecting device comprising:
    a sensor substrate that detects a position indicated by an indicator, the sensor substrate having a plurality of first loop coils disposed in a first direction and a plurality of second loop coils disposed in a second direction intersecting the first direction;
    a transmission signal generating circuit that generates a transmission signal to be supplied to at least one loop coil of the first loop coils and the second loop coils to effect electromagnetic coupling with the indicator;
    a received signal processing circuit that receives a signal induced in at least one loop coil of the first loop coils and the second loop coils based on electromagnetic coupling with the indicator, and that detects the position indicated by the indicator;
    a loop coil selecting circuit that selectively supplies the transmission signal generated by the transmission signal generating circuit to at least one loop coil of the first loop coils and the second loop coils;
    a control circuit that controls loop coil selection by the loop coil selecting circuit; and
    a magnetic path plate that forms a magnetic path for a magnetic flux generated by the transmission signal supplied to at least one loop coil of the first loop coils and the second loop coils, the magnetic path plate being disposed so as to be superposed on the sensor substrate;
    wherein when the transmission signal is supplied to loop coil(s) disposed in at least one direction among the first loop coils disposed in the first direction and the second loop coils disposed in the second direction, the control circuit controls the loop coil selecting circuit so as not to supply the transmission signal to a determined number of loop coil(s) that are disposed in said at least one direction and that are in at least one peripheral region of the sensor substrate along said at least one direction, and
    the indicator position detecting device further comprises at least one capacitor connected to the determined number of loop coil(s) not supplied with the transmission signal, the at least one capacitor being operable to produce tuned resonance with the transmission signal supplied to the loop coils other than the determined number of loop coil(s).

2. The indicator position detecting device according to claim 1,
    wherein the magnetic path plate has substantially a same size as the sensor substrate and is disposed so as to be superposed on the sensor substrate, and a loop coil supplied with the transmission signal and disposed at an extreme end of the sensor substrate is disposed inward on the sensor substrate than an end of the magnetic path plate located in a vicinity of the loop coil.

3. The indicator position detecting device according to claim 1,
    wherein the control circuit controls the loop coil selection such that the transmission signal is not supplied to the determined number of loop coils disposed in the at least one peripheral region of the sensor substrate and such that the transmission signal is supplied to a loop coil disposed in a vicinity of the determined number of loop coils during a period in which the transmission signal is otherwise to be supplied to the determined number of loop coils.

4. The indicator position detecting device according to claim 1,
    wherein the control circuit controls the loop coil selection such that the transmission signal is not supplied to the determined number of loop coils disposed in the at least one peripheral region of the sensor substrate for a period of time that is determined by the number of loop coils not supplied with the transmission signal and such that the transmission signal is supplied to a loop coil disposed in a vicinity of the determined number of loop coils during said period of time.

5. The indicator position detecting device according to claim 1,
    wherein the control circuit controls the loop coil selection such that the transmission signal is not supplied to the determined number of loop coils disposed in said one peripheral region nor a determined number of other loop coils that are disposed in said at least one direction and that are in a peripheral region on an opposite side from said one peripheral region.

6. The indicator position detecting device according to claim 1,
    wherein the control circuit controls the loop coil selection such that the transmission signal is not supplied to the determined number of loop coils disposed in the at least one peripheral region of the sensor substrate and such that those determined number of loop coils not supplied with the transmission signal are grounded.

7. The indicator position detecting device according to claim 1,
    wherein, in addition to the capacitor, a resistor is connected to the determined number of loop coils not supplied with the transmission signal, for producing tuned resonance with the transmission signal.

8. The indicator position detecting device according to claim 1,
    wherein the transmission signal generating circuit has a high-voltage mode for generating a high-voltage transmission signal and a low-voltage mode for generating a low-voltage transmission signal, and the transmission signal generating circuit is set in the low-voltage mode when the control circuit determines that the indicator is in a use state on a basis of detection output from the received signal processing circuit.

9. A method for reducing unwanted radiation from a sensor substrate of an indicator position detecting device configured to detect a position indicated by an indicator on the sensor substrate, the sensor substrate having a plurality of first loop coils disposed in a first direction and a plurality of second loop coils disposed in a second direction intersecting the first direction, the method comprising:
    generating transmission signals; and
    selectively supplying the generated transmission signals to the first loop coils and the second loop coils to effect electromagnetic coupling with the indicator in a defined sequence, wherein the defined sequence includes: (i)

supplying the transmission signals to loop coil(s) that are disposed in at least one direction, among the first loop coils disposed in the first direction and the second loop coils disposed in the second direction, and that are disposed in a non-peripheral region of the sensor substrate in said at least one direction, (ii) not supplying the transmission signals to a determined number of loop coil(s) that are disposed in said at least one direction and that are in at least one peripheral region of the sensor substrate along said at least one direction, and (iii) connecting at least one capacitor to the determined number of loop coil(s) not supplied with the transmission signals, the at least one capacitor being operable to produce tuned resonance with the transmission signals supplied to the loop coils disposed in the non-peripheral region of the sensor substrate.

10. The method according to claim 9,
wherein (ii) of the sequence includes supplying the transmission signals to, in place of the determined number of loop coils in said at least one peripheral region, a loop coil disposed in a vicinity of the determined number of loop coils during a period in which the transmission signals are otherwise to be supplied to the determined number of loop coils.

11. The method according to claim 9,
wherein (ii) of the sequence includes supplying the transmission signals to, in place of the determined number of loop coils in said at least one peripheral region, a loop coil disposed in a vicinity of the determined number of loop coils during a period that corresponds to the number of loop coils not supplied with the transmission signals.

12. The method according to claim 11,
wherein (ii) of the sequence includes supplying the transmission signals to, in place of a determined number of loop coils that are disposed in said at least one direction and that are in another peripheral region on an opposite side from said one peripheral region, a loop coil disposed in a vicinity of the loop coils in said another peripheral region.

13. The method according to claim 12,
wherein (ii) of the sequence includes supplying the transmission signals at the same time to both of the loop coil, which is disposed in the vicinity of the loop coils in said peripheral region, and the loop coil, which is disposed in the vicinity of the loop coils in said another peripheral region.

14. The method according to claim 9,
wherein (ii) of the sequence includes not supplying the transmission signals to the determined number of loop coils in said one peripheral region nor to a determined number of other loop coils that are disposed in said at least one direction and that are in another peripheral region on an opposite side from said one peripheral region.

15. The method according to claim 9,
wherein (ii) of the sequence includes grounding the determined number of loop coils in said one peripheral region that are not supplied with the transmission signals.

* * * * *